United States Patent [19]

Leary

[11] Patent Number: 5,436,766

[45] Date of Patent: Jul. 25, 1995

[54] BOND BETWEEN A RIGID REFRACTIVE ELEMENT AND A SURROUNDING HOUSING STRUCTURE IN AN OPTICAL SYSTEM CONTAINING A LIQUID REFRACTIVE ELEMENT

[75] Inventor: David F. Leary, Woodside, Calif.

[73] Assignee: Lockheed Missiles & Space Company, Inc., Sunnyvale, Calif.

[21] Appl. No.: 134,718

[22] Filed: Oct. 12, 1993

Related U.S. Application Data

[62] Division of Ser. No. 941,299, Sep. 4, 1992, abandoned.

[51] Int. Cl.⁶ .......................... G02B 1/06; G02B 3/12
[52] U.S. Cl. .................................................. 359/665
[58] Field of Search .......................... 359/665–667

[56] References Cited

U.S. PATENT DOCUMENTS 5,113,331  5/1992  Nagengast ........................ 364/267
5,180,219  5/1993  Geddie ............................. 364/61

Primary Examiner—Scott J. Sugarman
Attorney, Agent, or Firm—John J. Morrissey; J. P. Violette; Edward J. Radlo

[57] ABSTRACT

In an optical system comprising a pair of rigid (e.g., glass) lens elements 11 and 12 mounted coaxially within a hollow cylindrical housing 10 so as to define a gap therebetween, a liquid (which functions as a liquid lens element 13) is contained within the gap. The rigid lens elements 11 and 12 are bonded to corresponding interior surface portions of the cylindrical housing 10 by means of an adhesive material that also functions as a sealant to prevent leakage of liquid from the gap. The adhesive sealant material preferably consists of a fluorosilicone sealant marketed by Dow Corning Corporation of Midland, Mich. under the trademark DOW CORNING X5-8738.

9 Claims, 3 Drawing Sheets

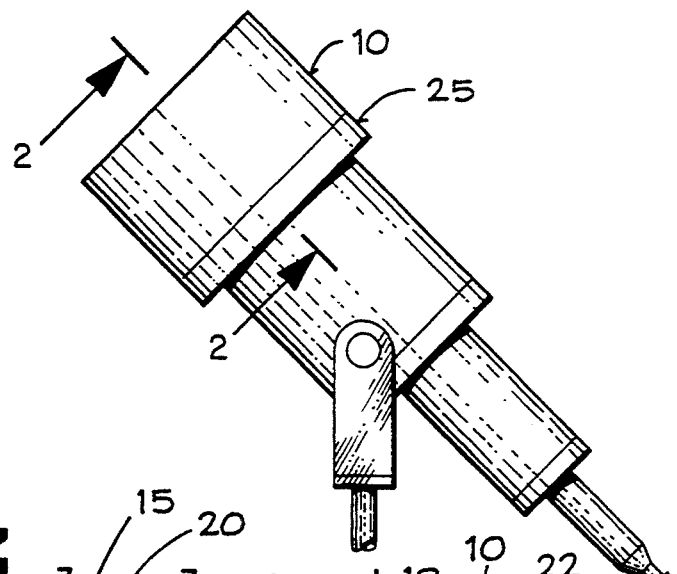
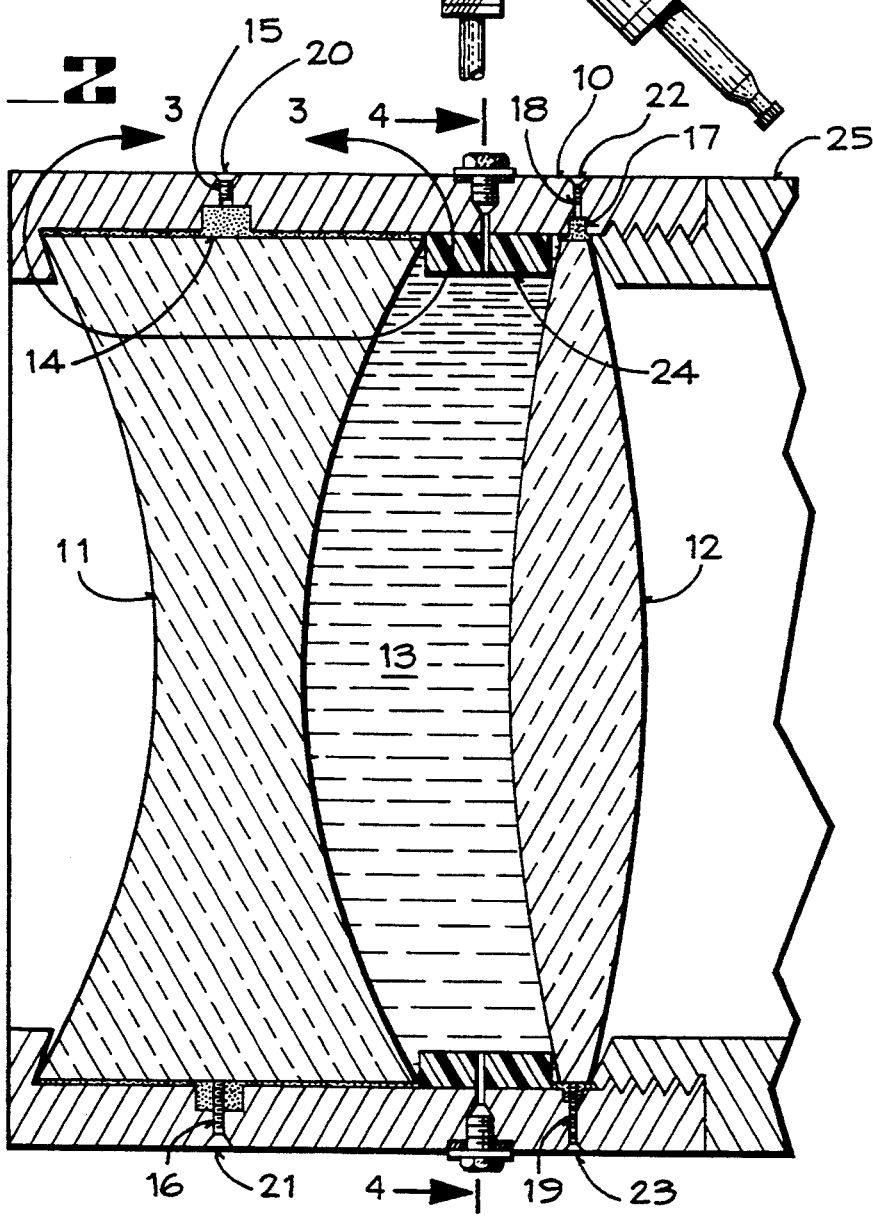

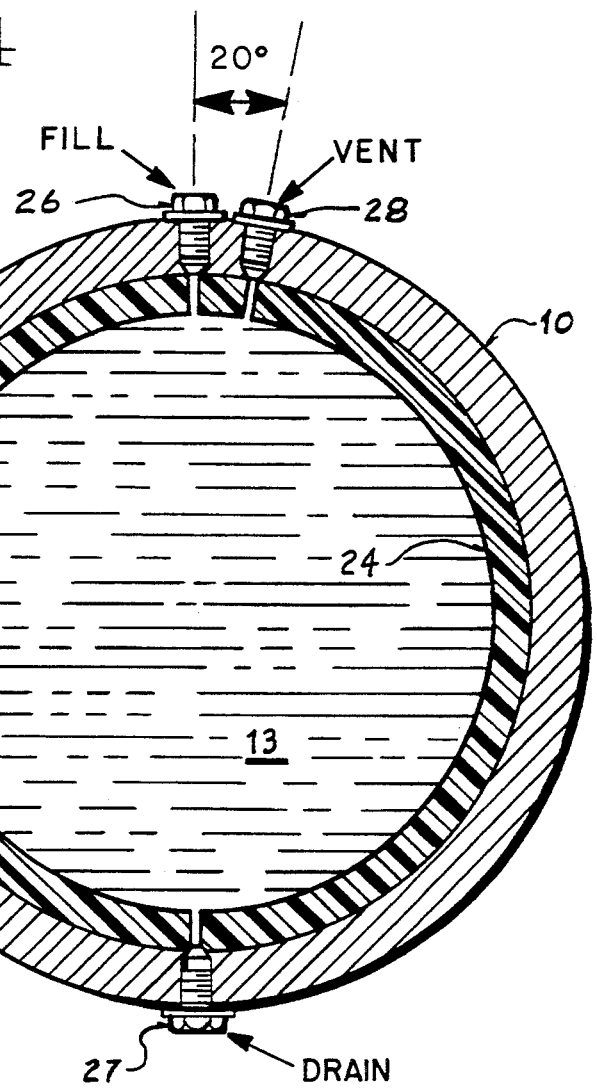
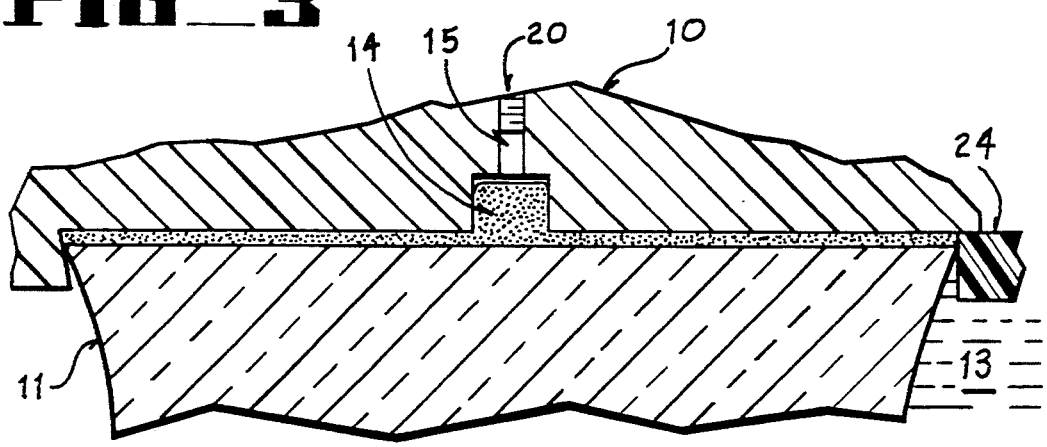

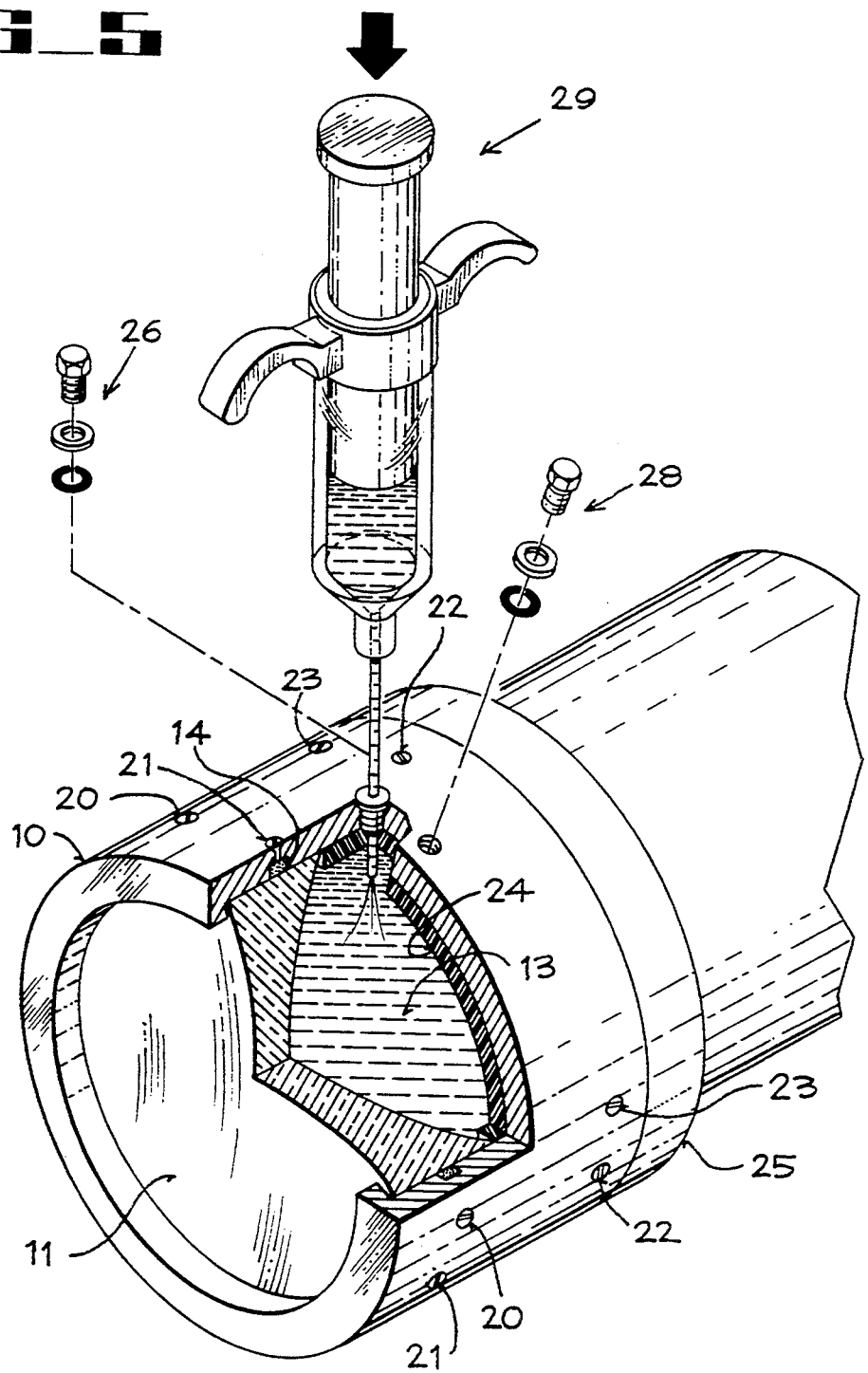
FIG_5

BOND BETWEEN A RIGID REFRACTIVE ELEMENT AND A SURROUNDING HOUSING STRUCTURE IN AN OPTICAL SYSTEM CONTAINING A LIQUID REFRACTIVE ELEMENT

This application is a division of Ser. No. 07/941,299 filed on Sep. 4, 1992, now abandoned.

TECHNICAL FIELD

This invention pertains generally to the formation of liquid refractive elements in optical systems, and more particularly to a technique for mounting rigid refractive elements so as to confine a liquid refractive element therebetween.

BACKGROUND ART

The use of liquid refractive elements in optical systems for the purpose of achieving color correction (i.e., correction of chromatic aberration) has been reported by only a very few investigators.

A technique was disclosed in U.S. Pat. No. 4,958,919 to R. D. Sigler for designing lens systems that are color-corrected at three or more is wavelengths using liquid lens elements in combination with rigid (e.g., glass, plastic or crystal) lens elements. Particular examples of color-corrected lens systems using liquid lens elements were disclosed in is U.S. Pat. No. 5,033,831 to R. D. Sigler, and in U. S. Pat. Nos. 4,911,538; 4,913,535; 4,915,483; 4,932,762 and 4,950,041 to P. N. Robb.

As discussed in U.S. Pat. No. 4,958,919, precise refractive index data at specified wavelengths are required for all the available liquids that are to be considered as candidates for use in forming liquid lens elements in color-corrected optical systems. However, there is a paucity of published refractive index data for most liquids.

In fabricating an optical system in which a liquid lens element is to be confined within a gap between two rigid (e.g., glass, plastic or crystal) lens elements, the rigid lens elements must be mounted so as to seal the liquid lens element within the gap. In a typical optical system (e.g., a telescope), rigid lens elements are mounted within a hollow cylindrical mounting device by means of an adhesive material, which is applied around the edges of the rigid lens elements to bond the edges of the rigid lens elements to interior surface portions of the mounting device. In order to confine a liquid lens element within a gap between two rigid lens elements, the adhesive material used to mount the rigid lens elements must be substantially impervious to the liquid comprising the liquid lens element. Adhesive materials ordinarily used for mounting refractive elements in optical systems have heretofore consisted of silicon rubber or epoxy resin.

It has been found experimentally from fabricating optical systems containing liquid refractive elements that adhesive bonds consisting of silicon rubber tend to swell when in contact with silicon oils, aldehydes, ketones, and to a lesser extent esters. In general, the swelling of a bond could cause the bond to fracture, and thus to lose effectiveness as a liquid-tight seal. Furthermore, the swelling of a bond securing a rigid lens element within a cylindrical mounting device produces edge forces on the rigid lens element. Such edge forces cause mechanical stresses in the rigid lens element that can introduce geometrical aberrations into the optical system.

It has also been experimentally observed that adhesive materials consisting of epoxy resin tend to undergo chemical decomposition when in contact with esters, aldehydes, ketones, aromatic hydrocarbons and aliphatic hydrocarbons. Thus, adhesive materials consisting of epoxy resin cannot be effectively used to form liquid-tight seals for confining many categories of liquids that, in terms of optical properties, would be good candidates for use as liquid refractive elements Practitioners in the relatively new art of fabricating color-corrected optical systems comprising liquid refractive elements have recognized a need for an adhesive sealant that is chemically non-reactive with silicon oils, esters, aldehydes, ketones, aromatic hydrocarbons and aliphatic hydrocarbons, and which does not swell upon contact with such liquids. More particularly, a need has been recognized for a sealant that can adhesively bond the edges of rigid (e.g., glass, plastic or crystal) refractive elements within a mounting device so as to confine a liquid refractive element consisting of a silicon oil, an ester, an aldehyde, a ketone, an aromatic hydrocarbon or an aliphatic hydrocarbon between the rigid refractive elements without leaking.

SUMMARY OF THE INVENTION

It is an object of the present invention to provide an adhesive sealant for securing rigid refractive elements within a mounting device so as to confine a liquid refractive element therebetween, where the liquid refractive element consists of a silicon oil, an ester, an aldehyde, a ketone, an aromatic hydrocarbon or an aliphatic hydrocarbon, and where the sealant is substantially impervious to the liquid refractive element.

It is a particular object of the present invention to provide a n technique for fabricating an optical system comprising a liquid refractive element contained within a gap between two rigid refractive elements, where the two rigid refractive elements are secured within a mounting device by means of an adhesive material that is:

1) self-curable (i.e., curable without being exposed to external chemicals—e.g., water vapor in the atmosphere);
2) elastomeric when cured; and
3) substantially non-reactive to silicon oils, esters, aldehydes, ketones, aromatic hydrocarbons and aliphatic hydrocarbons.

The present invention resulted from experimental research to identify an adhesive sealant that optimally fulfills the object of the present invention—viz., to function both as an adhesive for bonding a pair of rigid refractive elements (i.e., glass, plastic or crystal) to a mounting device, and also as a liquid-tight sealant for confining a liquid refractive element consisting of a silicon oil, an ester, an aldehyde, a ketone, an aromatic hydrocarbon or an aliphatic hydrocarbon between the rigid a refractive elements. It is noted that a sealant that is substantially impervious to a specified group of liquids is not necessarily an especially good adhesive; and vice versa a good adhesive is not necessarily impervious to all or any of the liquids in the specified group of liquids.

It was also determined that an optimal adhesive sealant for meeting the object of the present invention should be curable without exposure to external chemicals (e.g., without exposure to water vapor in the s atmosphere), so that complete curing of the sealant at the edges of the s rigid refractive elements can occur within confined grooves on an interior surface of the mounting device. Many existing materials marketed as s sealants were investigated to identify one or more that might have the characteristics required to fulfill the object of the present invention. There was no a priori indication that any particular material would optimally fulfill this object.

In the course of an extensive investigation of many different types of sealant materials, it was discovered that a certain slow-flowing fluorosilicone sealant presently being marketed as a new product by Dow Corning Corporation of Midland, Mich. under the designation "DOW CORNING X5-8738" is optimally suited for use as an adhesive sealant in fabricating color-corrected optical systems comprising liquid lens s elements made of silicon oils, esters, aldehydes, ketones, aromatic hydrocarbons and aliphatic hydrocarbons. It is noted that DOW CORNING X5-8738 is not presently marketed primarily as an adhesive, and has not heretofore been used as an adhesive in optical systems.

DOW CORNING X5-8738 is marketed as a sealant for containers holding jet fuels, gasoline, gasohol, motor oils and certain solvents. However, it was not known a priori how DOW CORNING X5-8738 would react when exposed to silicon oils, esters, aldehydes, ketones, aromatic hydrocarbons and aliphatic hydrocarbons over long time periods and over wide temperature ranges. Furthermore, it was not known a priori how effective DOW CORNING X5-8738 would be in adhesively bonding glass, plastic or crystal to a metal over long time periods and wide temperature ranges.

Experimental investigations leading to the present invention have established that DOW CORNING X5-8738 functions as a leak-tight sealant when exposed to silicon oils, esters, aldehydes, ketones, aromatic hydrocarbons and aliphatic hydrocarbons for periods of time longer than 24 months over temperature ranges from −40° C. to 60° C., and maintains glass-to-metal, plastic-to-metal and crystal-to-metal bonds of adequate strength for rugged optical mounting purposes over such ranges of time and temperature.

DESCRIPTION OF THE DRAWING

FIG. 1 is a side view of a telescope embodying a lens system according to the present invention in which a liquid lens element is contained between two rigid lens elements, which are mounted within a generally cylindrical housing by means of an adhesive sealant.

FIG. 2 is a cross-sectional view along line 2—2 of FIG. 1.

FIG. 3 is an enlarged cross-sectional view of a region within encircling line 3—3 of FIG. 2.

FIG. 4 is a cross-sectional view along line 4—4 of FIG. 2.

FIG. 5 is a broken-away perspective view of a portion of the telescope of FIG. 1 illustrating a technique for inserting the liquid lens element between the two rigid lens elements.

BEST MODE OF CARRYING OUT THE INVENTION

In FIG. 1, a generalized representation of an astronomical telescope (i.e., a typical example of an optical system) is illustrated. The telescope of FIG. 1 comprises a lens system (that may be conventional), which has been mounted within a generally cylindrical housing 10 by a technique according to the present invention.

In FIG. 2, the lens system of the telescope illustrated in FIG. 1 is shown as comprising a liquid lens element contained between two rigid (e.g., glass) lens elements. Thus, a first glass lens element 11 is secured within the housing 10 adjacent a foreward end thereof through which light enters the telescope. A second glass lens element 12 is likewise secured within the housing 10, and is spaced apart from the first lens element 11 so as to define a gap therebetween. Simply for purposes of illustration, the first glass lens element 11 is shown having concave surfaces on both sides, and the second glass lens element 12 is shown having convex surfaces on both sides. The first and second glass lens elements 11 and 12 are coaxially positioned with respect to a common optic axis, which coincides with a cylindrical axis of the housing 10. The gap between the first and second glass lens elements 11 and 12 is filled with a liquid, which functions as a liquid lens element 13.

As shown in FIG. 2, a peripheral portion of one surface (designated as the "forward" surface) of the first glass lens element 11 abuts an inwardly flanged foreward-end portion of the housing 10. The inwardly flanged foreward-end portion of the housing 10 is preferably non-perpendicular with respect to the optic axis of the system comprising the first and second glass lens elements 11 and 12 so as to minimize the amount of light that can be reflected paraxially through the telescope. A groove 14 is provided on an interior surface portion of the housing 10 encircling the first glass lens element 11;and a set of sealant bores 15 (only one of which is visible in the cross-sectional view of FIG. 2) and a set of set-screw bores 16 (only one of which is visible in FIG. 2) extend radially through the housing 10 into the groove 14. Similarly, a groove 17 is provided on an interior surface portion of the housing 10 encircling the second glass lens element 12; and a set of sealant bores 18 (only one of which is visible in FIG. 2) and a set of set-screw bores 19 (only one of which is visible in FIG. 2) extend radially through the housing 10 into groove 17.

In a particular embodiment of the telescope of FIG. 2, there could be, for example, three screw-threaded sealant bores 15 arranged at 120° intervals around the groove 14. Similarly, there could be three screw-threaded set-screw bores 16 arranged at 120° intervals around the groove 14—but off-set by 60° from the sealant bores 15. An adhesive sealant material (which is described in detail hereinafter) is introduced via the sealant bores 15 into the groove 14. The sealant material flows from the groove 14 around the circumferential edge of the first glass lens element 11 to provide an adhesive bond between the glass lens element 11 and the interior surface portion of the housing 10 encircling the glass lens element 11. After the adhesive sealant material has been introduced into the groove 14, corresponding closure screws 20 are secured in the bores 15 to confine the sealant material therein. Corresponding set screws 21 in the bores 16 likewise confine the sealant material within the groove 14, but also enable fine adjustment of the positioning of the first glass lens element 11 to be made during a time interval before the sealant material cures (i.e., becomes rigid).

Similarly, there could be, for example, three screw-threaded sealant bores 18 arranged at 120° intervals around the groove 17, and three screw-threaded set-screw bores 19 arranged at 120° intervals around the groove 17—but off-set by 60° from the sealant bores 18. The same kind of adhesive sealant material is introduced via the sealant bores 18 into the groove 17. The sealant material flows from the groove 17 around the circumferential edge of the second glass lens element 12 to provide an s adhesive bond between the glass lens element 12 and the interior surface portion of the housing 10 encircling the glass lens element 12. After the adhesive sealant material has been introduced into the groove 17, corresponding closure screws 22 are secured in the bores 18 to confine the sealant material therein. Corresponding set screws 23 in the bores 19 likewise confine the sealant material within the groove 17, but also enable fine adjustment of the positioning of the second glass lens element 12 to be made during a time interval before the sealant material cures (i.e., becomes rigid).

The adhesive sealant material, as described hereinafter, functions as an adhesive bond to secure the circumferential edges of the first and second glass lens elements 11 and 12 to the corresponding interior surface portions of the housing 10. However, the adhesive sealant material also functions as a sealant to prevent leakage of the liquid that comprises the liquid lens element 13 out of the gap between the first and second glass lens elements 11 and 12 along the circumferential edges thereof. The adhesive sealant material must therefore be substantially inert with respect to the liquid that comprises the liquid lens element 13.

As shown in FIG. 2, a spacer ring 24 positioned coaxially within the cylindrical housing 10 abuts a peripheral portion of the other surface (designated as the "rear" surface) of the first glass lens element 11. The spacer ring 24 is made of a rigid material, such as a non-brittle plastic (e.g., polytetrafluoroethylene marketed by E. I. du Pont de Nemours and Company, Inc. of Wilmington, Del. under the trademark "Teflon"), which is substantially inert with respect to the liquid comprising the liquid lens element 13. A peripheral portion of one surface (designated as the "forward" surface) of the second glass lens element 12 abuts the spacer ring 24, which maintains the gap between the first and second glass lens elements 11 and 12. An interior rear-end surface portion of the cylindrical housing 10 is screw-threaded to receive a matingly screw-threaded exterior forward-end surface portion of a hollow cylindrical connecting member 25 of the telescope.

In a particular application contemplated for the present invention (e.g., a color-corrected lens system as discussed in the above-referenced is patents to R. D. Sigler), the liquid comprising the liquid lens element 13 could consist of a silicon oil such as polydimethylsiloxane marketed by R. P. Cargille Laboratories, Inc. of Cedar Grove, N.J. In other embodiments, the liquid comprising the liquid lens element 13 could consist of an ester such as ethyl cinamate, an aldehyde such as trans-cinnamaldehyde, a ketone, an aromatic hydrocarbon or an aliphatic hydrocarbon. However, silicon oils, aldehydes, ketones, and to a lesser extent esters, in contact with a silicon rubber bond, tend to infiltrate the silicon rubber bond, thereby causing swelling (and consequently weakening and eventually fracturing) of the bond. Esters, aldehydes, ketones, aromatic hydrocarbons and aliphatic hydrocarbons tend to react chemically with epoxy resin bonds, thereby causing such bonds to deteriorate and eventually to leak. Consequently, the adhesive sealant material introduced into the grooves 14 and 17 cannot consist of silicon rubber or epoxy resin (i.e., the adhesive materials most commonly used in so the prior art for mounting glass, plastic and crystal refractive elements in optical systems). In accordance with the present invention, the adhesive sealant material must be physically and chemically non-reactive with respect to the liquid comprising the liquid lens element 13.

As illustrated in FIG. 2, a forward edge of the cylindrical connecting member 25 abuts a peripheral portion of the other surface (designated as the "rear" surface) of the second glass lens element 12. The forward edge of the cylindrical connecting member 25 is preferably non-perpendicular with respect to the optic axis of the system comprising the first and second glass lens elements 11 and 12 so as to minimize the amount of light that can be reflected paraxially through the telescope. The inwardly flanged forward-end portion of the housing 10, the spacer ring 24, and the forward edge of the connecting member 25 all co-act with each other to maintain the first and second glass lens elements 11 and 12 in proper position with respect to each other in accordance with a predetermined design (i.e., optical prescription) for the lens system of the telescope. As indicated in FIG. 1, the connecting member 25 is joined in a conventional manner (e.g., as by brazing) to a generally cylindrical central section of the telescope.

The adhesive sealant material on the circumferential edges of the first and second glass lens elements 11 and 12 serves an adhesive function in forming glass-to-metal bonds, and also serves a sealing function in preventing leakage of the liquid comprising the liquid lens element 13 from the gap between the first and second glass lens elements 11 and 12. The grooves 14 and 17 are dimensioned to accommodate any differential expansion or contraction of the adhesive sealant material with respect to the housing 10 that might occur under conditions of extreme temperature variations.

FIG. 3 is an enlarged cross-sectional view of the glass-to-metal bond between the circumferential edge of the first glass lens element 11 and the encircling interior surface portion of the housing 10. A sufficient quantity of sealant material is introduced into the groove 14 to enable most (or all) of the circumferential edge of the first glass lens element 11 to be covered therewith. Similarly, a sufficient quantity of sealant material is introduced into the groove 17 to enable most (or all) of the circumferential edge of the second glass lens element 12 to be covered therewith. The preferred adhesive sealant material in accordance with the present invention is DOW CORNING X5-8738, which is marketed by Dow Corning Corporation of Midland, Mich.

FIG. 4 provides a cross-sectional view of the telescope of FIG. 1 in a transverse plane through the liquid lens element 13 perpendicular to the optic axis. Ports are shown in FIG. 4 through which the gap between the first and second glass lens elements 11 and 12 can be filled with (and drained of) the liquid that functions as the liquid lens element 13. Thus, a plug assembly 26 (comprising a screw-threaded plug, a washer, and an O-ring seal) is fitted into a matingly screw-threaded first opening through the cylindrical housing 10, which is aligned with a small-bore first opening through the spacer ring 24. The aligned first openings through the cylindrical housing 10 and the spacer ring 24, which can be closed and sealed by the plug assembly 26, form a "fill port" through which the liquid that functions as the liquid lens element 13 can be introduced into the gap between the first and second glass lens elements 11 and 12.

A similar plug assembly 27 is fitted into a screw-threaded second opening through the cylindrical housing 10, which is aligned with a small-bore second opening through the spacer ring 24. Preferably, the aligned second openings are diametrically opposite the first openings. The second openings, which can be closed and sealed by the plug assembly 27, form a "drain port" through which the liquid that functions as the liquid lens element 13 can be removed from the gap between the first and second glass lens elements 11 and 12. A similar plug assembly 28 is fitted into a third opening through the cylindrical housing 10, which is aligned with a small-bore third opening through the spacer ring 24. The aligned third openings are angularly separated from the aligned first openings by a relatively small angle (about 20°) measured radially from the cylindrical axis of the cylindrical housing 10. The third openings, which can be closed and sealed by the plug assembly 28, form a "vent port" through which air can exit from the gap between the first and second glass lens elements 11 and 12 as the liquid that functions as the liquid lens element 13 is being introduced into the gap.

In FIG. 5, a technique is illustrated in which a conventional hypodermic injection device 29 is used to fill the gap between the first and second glass lens elements 11 and 12 with an appropriate liquid to form the liquid lens element 13. The plug, washer and O-ring seal comprising the plug assembly 26 are removed from the "fill port", and the plug, washer and O-ring seal comprising the plug assembly 28 are removed from the "vent port". Of course, the plug assembly 27 (not visible in the perspective of FIG. 5) remains securely in place in the "drain port" while the liquid forming the liquid lens element 13 is being introduced into the gap between the first and second glass lens elements 11 and 12.

The adhesive sealant material in liquid form can be introduced in a similar manner (i.e., by means of a hypodermic injection device) via the bores 15 and 18 into the grooves 14 and 17, respectively. One or more of the closure screws 20 and 21 would be removed while the adhesive sealant material is being injected in order to allow air to be vented from the grooves 14 and 17 as the adhesive sealant material is being introduced.

In an alternative technique for filling the gap between the first and second glass lens elements 11 and 12 with a liquid to form the liquid lens element 13, the "vent port" could be eliminated (or could remain sealed by the plug assembly 28), and a hollow needle could be used—one end of which is inserted into the gap between the first and second glass lens elements 11 and 12 through the "fill port", and the other end of which is connected initially to a means for withdrawing air from the gap so as to form a vacuum therein and thereafter to a means for injecting the liquid into the evacuated gap.

The present invention has been described above in terms of a particular embodiment fabricated using a particular kind of material (i.e., glass) for the rigid lens elements of the lens system. However, other embodiments using other kinds of materials (e.g., crystal or plastic materials) for the rigid lens elements would become apparent to practitioners skilled in the art upon perusal of the foregoing specification and the accompanying drawing. Therefore, the specification and drawing presented herein are to be understood as merely illustrative of the invention, which is more generally defined by the following claims and their equivalents.

I claim:

1. A bond between a rigid refractive element and a surrounding housing structure in an optical system containing a liquid refractive element, said bond comprising:
   a) a surface portion of said rigid refractive element;
   b) a surface portion of said surrounding housing structure; and
   c) a sealant interposed between said surface portion of said rigid refractive element and said surface portion of said surrounding housing structure, said sealant adhesively attaching said surface portion of said rigid refractive element to said surface portion of said surrounding housing structure, said sealant being substantially impermeable and chemically inert with respect to a liquid selected from a group consisting of silicon oils, esters, aldehydes, ketones, aromatic hydrocarbons and aliphatic hydrocarbons, said sealant being curable without being exposed to external chemicals, said sealant being elastomeric when cured.

2. The bond of claim 1 wherein said sealant substantially consists of a fluorosilicone material.

3. The bond of claim 2 wherein said sealant substantially consists of a material marketed under the trademark DOW CORNING X5-8738.

4. A bond for sealing a liquid refractive element between first and second rigid refractive elements and a surrounding housing, said bond including
   a) a first surface portion of said first rigid refractive element;
   b) a second surface portion of said second rigid refractive element;
   c) a third surface portion of said surrounding housing structure; and
   d) a sealant interposed between said first and second surface portions of said rigid refractive elements and said third surface portion of said surrounding housing, said sealant adhesively attaching said first and second surface portions of said rigid refractive elements to said third surface portion of said surrounding housing, said sealant being substantially impermeable and chemically inert with respect to a liquid selected from a group consisting of silicon oils, esters, aldehydes, ketones, aromatic hydrocarbons and aliphatic hydrocarbons.

5. A bond as in claim 4, said sealant being curable without being exposed to external chemicals.

6. A bond as in claim 4, said sealant being elastomeric when cured.

7. A method for bonding a rigid refractive element and a surrounding housing in an optical system containing a liquid refractive element, said method including the steps of:
   a) obtaining an elastomeric, adhesive sealant substantially impermeable and chemically inert with respect to the liquid refractive element, the liquid refractive element comprising a liquid selected from a group consisting of silicon oils, esters, aldehydes, ketones, aromatic hydrocarbons and aliphatic hydrocarbons;
   b) attaching a surface portion of said rigid refractive element and a surface portion of said surrounding housing with said sealant; and
   c) curing said sealant without exposure to external chemicals.

8. A method as in claim 7, step (a) including the sub-step of:
   selecting said sealant from a group substantially consisting of fluorosilicone compounds.

9. A method as in claim 7, step (a) including the sub-step of:
   selecting said sealant from a group substantially consisting of a material marketed under the trademark DOW CORNING X5-8738.

* * * * *